Figures 1, 2:
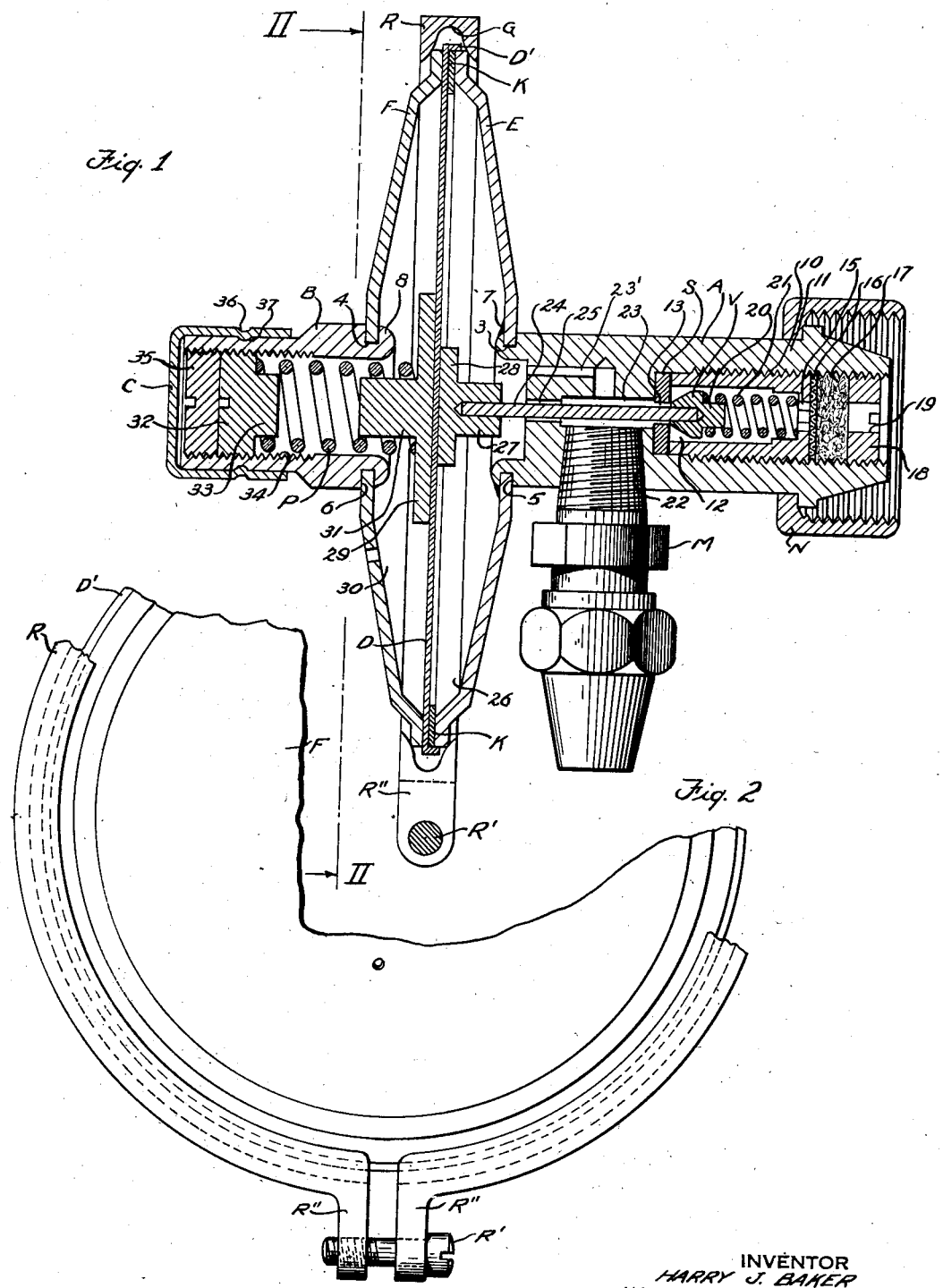

June 6, 1939.　　　H. J. BAKER ET AL　　　2,161,544
FLUID PRESSURE REGULATOR
Original Filed Jan. 12, 1931

INVENTOR
HARRY J. BAKER
WILLIAM F. MESINGER
BY
ATTORNEY

Patented June 6, 1939

2,161,544

UNITED STATES PATENT OFFICE 2,161,544

FLUID PRESSURE REGULATOR

Harry J. Baker, Indianapolis, Ind., and William F. Mesinger, Mount Vernon, N. Y., assignors to Oxweld Acetylene Company, a corporation of West Virginia Continuation of application Serial No. 508,238, January 12, 1931. This application February 6, 1936, Serial No. 62,586

2 Claims. (Cl. 50—23)

This invention relates to fluid pressure regulators and more particularly to a regulator mechanism especially adapted for reducing and regulating the pressure of a gas, such as acetylene, delivered from a container to a gas consuming or utilizing means such as a torch, a lighting system or an engine primer.

The principal objects of this invention are: To provide an improved regulator made of parts which shall be inexpensive to manufacture and assemble; to provide a regulator in which some of the parts may be made of stamped sheet metal and simply and efficiently secured together; and to provide a construction that will allow the use of a larger effective pressure-responsive diaphragm in a given space.

The above and other objects and the novel features of the invention will be apparent from the following description taken in connection with the drawing; in which, Fig. 1 is a central longitudinal sectional view of a regulator embodying this invention; and, Fig. 2 is a transverse section of the same taken on the line II—II of Fig. 1.

Referring to the drawing, the improved regulator comprises a valve V which cooperates with a seat S, both located in a casing A. The valve V is arranged to be unseated by the force of a spring P when released by a pressure-responsive device, such as the circular metal diaphragm D, and the pressure at which the diaphragm automatically allows the valve to open is determined by the adjustment of the spring P located in a casing B. To provide a housing for the diaphragm D and to mechanically connect the casings A and B, we employ a pair of dished annular sheet metal plates E and F, preferably identical in shape. The opposed ends of the cylindrical metal casings A and B are, respectively, secured in the central openings in the plates E and F, in such manner that the concave sides of the plates face away from the casings. To complete the regulator casing, the plates are so assembled that their concave faces are opposed, thus forming a housing for a diaphragm. Adjacent their peripheries, the plates bear against the opposite sides of the diaphragm near its rim; and the plates and interposed diaphragm, as well as the casings A and B, are secured together by means of a unitary split clamping ring R having a bolt R' for tightening or loosening the same and a groove G that receives the peripheral edges of the plates and the diaphragm.

The casings A and B are preferably secured to the plates E and F by reducing the opposed ends of the casings to a size to tightly fit the central openings 3 and 4 in the plates and to provide annular shoulders 5 and 6 supporting the edges adjacent such openings. After the ends of the casings are inserted in the openings 3 and 4, the outer ends of the casings are upset or turned outwardly, as at 7 and 8, so as to overlap the edges 3 and 4 and thus produce annular grooves in which these edges are permanently secured, the turned-over end 7 being preferably soldered along its edge to the plate E to insure a gas-tight joint at this point.

The periphery of the diaphragm D desirably has a flange D' that engages the periphery of the plate E, and an annular gasket K is disposed adjacent but within said flange and in engagement with the adjoining faces of the diaphragm and the plate E. The groove G in the inner face of the clamping ring R is coextensive with the peripheries of the plates E and F and the diaphragm D, and is substantially V-shaped so that its inclined surfaces will engage the outer corners of the peripheral edges of the plates E and F and tightly clamp together these plates, as well as the diaphragm and gasket, as the ring is contracted. As shown, substantially parallel annular flat and relatively narrow surfaces are provided on the opposed faces of the plates E and F immediately adjacent their peripheral edges, to bear against and grip therebetween the marginal portion of the diaphragm D. The clamping ring R constitutes the sole means for pressing together and securing the plates E and F with the diaphragm D and gasket K between. The corners of the plates E and F which are in contact with the surfaces of the groove G are relatively sharp or have very small radii to insure that the contact between each groove face and the corresponding plate is substantially a single circular line. The single line contact is provided so that the normal pressure on the gasket is substantially equal over the complete periphery, for the cam ring R is then free to tilt slightly at various places, adjusting itself when contracted to act on both plates with a pressure that is substantially equally distributed. The shape and material of the plates provide in them a radial resilient reaction which cooperates with the ring to maintain this equally distributed pressure constant at all times. The ring R also serves as a cover for the edges of the plates E and F and diaphragm D to completely protect them from damage. The two outwardly-projecting lugs R'' are apertured, and one is threaded, to receive the connecting bolt R' which is adapted to tighten or loosen the clamping ring.

The valve casing A desirably consists of a cylindrical body having an axial bore therethrough, one end of which bore comprises an internally-threaded inlet cavity 10. An externally-threaded thimble 11 is secured in the cavity 10 and provides a chamber 12 for the valve V which cooperates with a central hole 13 in the annular valve seat S held in the bottom of the cavity 10 by the lip of the thimble 11. Fluid enters the chamber 12 through an aperture 15 in the bottom of the thimble, and moisture and dust are excluded from the chamber by a screen disc 16 and a felt disc 17. A threaded plug 18, having an aperture 19, is secured in the cavity 10 to hold the disc 17 against one face of the disc 16, thereby holding the other face of the disc 16 against the bottom of the thimble 11 to cover the aperture 15. The valve V is substantially frustro-conical in shape, with its smaller end adjacent the seat S; and at its larger end the valve has an integral projection 20. One end of a helical spring 21 surrounds the projection 20 and seats against the valve, and its other end seats in a recess in the bottom of the thimble 11, so that the spring 21 normally tends to press the valve V against the seat S to close the opening 13.

The valve casing A has a threaded lateral outlet 22 which opens into an enlarged part or outlet chamber 23 between the ends of the axial bore of the casing; and a push pin or stem 24 operatively connects the diaphragm D to the valve V to lift the latter off its seat and thereby admit fluid from the valve camber 12 to the outlet chamber 23 and outlet 22. As shown, one end of the stem 24 fits tightly into a socket in the smaller end of the valve V, from which point the stem extends through the hole 13 in the seat S, then through the chamber 23 and a contracted passage 25 of the bore through the partition at the upper end of the outlet chamber into the diaphragm chamber 26, where its other end fits tightly into a socket in the reduced end 27 of a bearing plate 28 which abuts against the central part of one face of the diaphragm D. A free passage 23' is provided between outlet chamber 23 and diaphragm chamber 26 to allow the pressure variations of the gas delivered to act on the diaphragm unimpededly. The passage 23' enters the outlet chamber 23 substantially perpendicularly to the stem 24 whereby the velocity of gas flowing upwardly in chamber 23 along the stem does not adversely affect the pressure impulse transmitted to the diaphragm, and thus the diaphragm responds to the static outlet pressure only. Accordingly, when the static fluid pressure in the low pressure outlet 22, and in the chamber 23 communicating therewith, falls below a predetermined pressure, the diaphragm responds to allow spring P to unseat the valve V; and when the predetermined outlet pressure is exceeded, the spring 21 in cooperation with the diaphragm D acts to close the valve V, thus maintaining the outlet pressure close to the outlet pressure desired.

The improved regulator may be used for reducing and regulating the pressure of acetylene supplied from a tank of acetylene at about 200 pounds pressure and delivered at five pounds pressure to a primer connected to the intake manifold of an internal combustion engine, in which event the casing A may carry a coupling nut N adapted to secure the valve to the outlet fitting of a tank, and a compression union fitting M may be secured in the outlet 22 to connect the latter to the engine primer or other consuming device.

The pressure of the spring P in the casing B may be varied at will in order to adjust the spring pressure on the diaphragm D so that it will function at any desired pressure. As shown, one end of the spring P bears against a plate 29 which engages the face of the diaphragm D centrally and directly opposite the one engaged by the plate 28. The plate 29 is located in the compartment 30 of the diaphragm housing and has a reduced section 31 projecting into and centering the spring P. The other end of the spring P bears against a threaded plug or button 32 which has a centering projection 33 fitting into the adjacent end of said spring. The plug 32 may have a screw-driver slot so that it can be readily adjusted in either direction in the threaded bore 34 of the casing B, to vary the pressure of the spring P, and thus determine the pressure of the gas delivered through the outlet 22. A threaded plug 35 may be provided to lock the plug 32 in its adjusted positions; and a detachable cap C covers the outer end of the bore 34 and may have indentations 36 in its skirt interfitting with a corresponding annular depression 37 in the outer surface of the casing B to retain the cap in place.

The operation of the regulator will be readily understood from the foregoing description. The improved construction allows the use of a larger effective diaphragm in a given space; the use of similar stamped metal plates for both halves of the diaphragm housing reduces the cost and simplifies assembling the casings A and B, and the parts they carry, in axial alignment; the use of the improved clamping ring to secure together such plates and the interposed diaphragm, and the elimination of the numerous bolts and similar fastening devices generally employed in such regulators, reduces assembling and manufacturing expense and produces a compact and efficient regulator having a much better appearance.

Certain parts of the invention, such as the casing construction, may be used in combination with different types of valves and other devices. While one form of the improved regulator is here shown and described in detail, it is to be understood that numerous changes may be made in the construction disclosed without departing from the principles of the present invention or sacrificing any of its advantages.

This application is a continuation of our co-pending application, Ser. No. 508,238, filed January 12, 1931.

We claim:

1. A fluid pressure regulator comprising a valve casing having inlet and outlet chambers; a valve seat between said inlet and outlet chambers; an outlet passage for discharging gas from said outlet chamber; a valve controlling flow through said seat between said chambers and closing in the normal direction of said flow; a partition across the end of said outlet chamber opposite said valve seat; a passage through said partition axially in line with said valve; a diaphragm chamber at the upper end of said casing; a pressure responsive diaphragm forming an upper wall of said diaphragm chamber; resilient means acting against the upper surface of the diaphragm for regulating the pressure to which it responds; a valve stem operatively connecting said valve and said diaphragm for transmitting movement to said valve and passing axially through said seat and freely through the passage in said partition whereby a portion of the gas flowing axially through said seat follows said valve stem through the clearance space between said stem and said passage into the diaphragm chamber wherein such portion of gas tends to produce an undesired increment of pressure; a passageway of larger cross sectional area than that of the clearance space between said valve stem and said partition arranged for conducting gas freely from said diaphragm chamber to said outlet chamber, said passage entering said outlet chamber substantially perpendicularly to the axis of the valve stem and at a point spaced from said outlet passage whereby said diaphragm is responsive to static outlet pressure only.

2. A fluid pressure regulator comprising a valve casing having a chamber; a valve seat dividing said chamber into inlet and outlet portions; an outlet passage for discharging gas from said outlet portion; a valve controlling flow through said seat between the inlet and outlet portions of said chamber and closing in the normal direction of said flow; a partition across the end of said outlet portion opposite said valve seat; a passage through said partition axially in line with said valve; a diaphragm chamber adjacent said partition; a pressure responsive diaphragm forming one wall of said diaphragm chamber; resilient means acting against the upper surface of the diaphragm for regulating the pressure to which it responds; a valve stem between said valve and said diaphragm for transmitting movement to said valve and passing axially through said seat and freely through the passage in said partition whereby a portion of the gas flowing axially through said seat passes through the clearance space between said stem and the wall of the passage through the partition into the diaphragm chamber; a passage for freely passing said portion of gas from said diaphragm chamber to said outlet portion, said passage connecting said diaphragm chamber to said outlet portion at a point opposite said outlet passage and entering said outlet portion in a direction perpendicular to the direction of gas flow in said outlet portion whereby the diaphragm responds solely to static outlet pressure.

HARRY J. BAKER.
WILLIAM F. MESINGER.